(12) United States Patent
Crabb et al.

(10) Patent No.: US 12,474,690 B2
(45) Date of Patent: Nov. 18, 2025

(54) DATA-EFFICIENT MULTI-ACQUISITION STRATEGY FOR SELECTING HIGH-COST COMPUTATIONAL OBJECTIVE FUNCTIONS

(71) Applicant: Geminus.AI, Inc., Cambridge, MA (US)

(72) Inventors: Nicholas C. Crabb, Sunnyvale, CA (US); Karthikeyan Duraisamy, Ann Arbor, MI (US)

(73) Assignee: Geminus.AI, Inc., Cambridge, MA (US)

(*) Notice: Subject to any disclaimer, the term of this patent is extended or adjusted under 35 U.S.C. 154(b) by 408 days.

(21) Appl. No.: 18/112,864

(22) Filed: Feb. 22, 2023

(65) Prior Publication Data

US 2024/0280962 A1    Aug. 22, 2024

(51) Int. Cl.
*G05B 19/4155* (2006.01)
*G05B 19/418* (2006.01)
*G05B 23/02* (2006.01)

(52) U.S. Cl.
CPC ..... *G05B 19/4155* (2013.01); *G05B 19/4183* (2013.01); *G05B 23/0254* (2013.01)

(58) Field of Classification Search
CPC ............ G05B 19/4155; G05B 19/4183; G05B 23/0254; G05B 13/0265; G05B 17/02
See application file for complete search history.

(56) References Cited

U.S. PATENT DOCUMENTS

| | | |
|---|---|---|
| 8,190,418 B1 | 5/2012 | Fender |
| 10,417,614 B2 | 9/2019 | Johnson et al. |
| 10,564,993 B2 | 2/2020 | Deutsch et al. |
| 10,762,475 B2 | 9/2020 | Song et al. |

(Continued)

FOREIGN PATENT DOCUMENTS

| | | | |
|---|---|---|---|
| CN | 115048886 A | * | 9/2022 |
| WO | 2021/052777 A1 | | 3/2021 |

(Continued)

OTHER PUBLICATIONS

Cai, Z. English translation of CN-115048886-A, 2022 (Year: 2022).*

(Continued)

*Primary Examiner* — Kamini S Shah
*Assistant Examiner* — Jonathan Michael Skrzycki
(74) *Attorney, Agent, or Firm* — Mark P. Mathison (57) ABSTRACT

A method of optimizing parameters for an industrial process is described, along with media and systems, using a digital twin, physics based model and multiple types of acquisition functions. Output data from the model is analyzed by multiple types of Bayesian acquisition functions, such as an expected improvement acquisition function and a model variance acquisition function. The different acquisition functions tune better parameters, and then then model is re-run in parallel for each to output more data. The data from one acquisition function's run of the model may be co-mingled with data from the other acquisition function's run of the model such that the acquisition functions' exploration and (Continued)

exploitation of the parameter space are intertwined, thus achieving a more globally optimal solution than using just one type of Bayesian acquisition function.

20 Claims, 5 Drawing Sheets

(56) References Cited

U.S. PATENT DOCUMENTS

| | | | |
|---|---|---|---|
| 10,877,470 B2 | 12/2020 | Burd et al. | |
| 11,209,345 B1 | 12/2021 | Madsen et al. | |
| 2015/0226049 A1 | 8/2015 | Frangos et al. | |
| 2017/0323403 A1 | 11/2017 | Johnson et al. | |
| 2018/0239851 A1* | 8/2018 | Ypma | G03F 7/70516 |
| 2020/0162354 A1 | 5/2020 | Drees et al. | |
| 2020/0293835 A1 | 9/2020 | Doni et al. | |
| 2020/0327264 A1* | 10/2020 | Wang | H02J 3/008 |
| 2021/0178585 A1* | 6/2021 | Rozo | G06N 3/006 |
| 2021/0210214 A1 | 7/2021 | Hampshire et al. | |
| 2021/0248293 A1 | 8/2021 | Yokota et al. | |
| 2022/0032395 A1* | 2/2022 | Kroschel | B23K 31/125 |
| 2022/0092234 A1 | 3/2022 | Karri et al. | |
| 2022/0379919 A1* | 12/2022 | Bagschik | B60W 60/0015 |
| 2023/0026782 A1 | 1/2023 | Sha et al. | |
| 2023/0106530 A1* | 4/2023 | Chakrabarty | G05B 13/0265 700/31 |
| 2023/0120165 A1 | 4/2023 | Hansen et al. | |

FOREIGN PATENT DOCUMENTS

| | | |
|---|---|---|
| WO | 2021/209432 A1 | 10/2021 |
| WO | 2022/269020 A1 | 12/2022 |
| WO | 2023/287239 A1 | 1/2023 |

OTHER PUBLICATIONS

Zhang, S. "An Efficient Batch-Constrained Bayesian Optimization Approach for Analog Circuit Synthesis via Multiobjective Acquisition Ensemble", Jan. 2022, URL:<https://ieeexplore.ieee.org/document/9336041> (Year: 2021).*

PCT/US2024/016677 "International Preliminary Report on Patentability (Chapter II of the PCT)" [IPRP], Jan. 27, 2025, 42 pages, International Preliminary Examining Authority is USPTO (IPEA/US), Alexandria, Virginia.

* cited by examiner

DATA-EFFICIENT MULTI-ACQUISITION STRATEGY FOR SELECTING HIGH-COST COMPUTATIONAL OBJECTIVE FUNCTIONS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

BACKGROUND

1. Field of the Art

Embodiments of the present invention generally relate to optimizing computational models to facilitate monitoring or troubleshooting of an industrial process, and more specifically to using a multi-acquisition function strategy to select high-cost computational objective functions.

2. Description of the Related Art

An industrial plant can be a facility, equipment, or a combination thereof used in connection with, or as part of, any process or system for industrial production or output. Examples of industrial plants can include plastic manufacturing plants, chemical plants, metal manufacturing plants, food processing plants, water or waste processing plants, energy production facilities, etc.

Digital twins can be virtual representations of real-world systems or processes. The digital twins can be a result of a culmination of technologies including artificial intelligence, physics modeling, 5G, internet of thing (IOTs), etc. For complex, real-world systems or processes, such as those performed in the industrial plants, generating an accurate digital twin can be difficult. Additionally, for a problem occurring in complex, real-world systems or processes, it can be difficult to diagnose the problem or to replicate the problem in a digital twin.

To improve the accuracy and efficacy of digital twins, optimization techniques can be implemented to estimate parameters within the digital twins. The parameters can be optimized based on objective functions, which can define relationships between the parameters and an output of a digital twin. For example, Bayesian optimization can be an optimization technique that uses probabilistic methods to optimize objective functions that are non-differentiable, discontinuous, or time-consuming (i.e., computationally expensive) to evaluate. However, Bayesian optimization can be highly sensitive to a setup or configuration of an algorithm associated with implementing the Bayesian optimization. Additionally, in Bayesian optimization, all data other than a final objective quantity of interest may be deleted or otherwise disposed of. Therefore, there can be a need for creating a less sensitive and more data efficient method of performing Bayesian optimization.

BRIEF SUMMARY

Certain aspects and examples of the present disclosure relate to a system and method for selecting high-cost computational objective functions using a data-efficient multi-acquisition strategy. The data-efficient multi-acquisition strategy can be a computational optimization scheme for optimizing input parameters of a computation model. The computation model can be a digital twin of an industrial plant or of specific processes or systems associated with the industrial plant. The input parameters can be values or settings of physical components of the industrial plant, process, or system. In some examples, the computation model can be expensive to execute and can output large datasets. Additionally, the high-cost computational objective functions can define relationships between the input parameters and outputs of the computational model, and selecting the high-cost computational objective functions can involve selecting values for the input parameters.

The data-efficient multi-acquisition strategy can be associated with performing Bayesian optimization. Current techniques for performing Bayesian optimization can include executing an acquisition function to determine where to evaluate an objective function next. For example, the acquisition function can determine a value for an input parameter that can be used in a subsequent execution of the computation model. There can be many types of acquisition functions associated with different strategies for determining where to evaluate the objective function next. For example, a probability of improvement acquisition function can determine a point (i.e., one or more values for one or more input parameters) with a highest probability of improving the accuracy of the outputs of the computation model. Another type of acquisition function can be a model variance acquisition function, in which areas (i.e., values of input parameters) associated with high uncertainty can be located or explored.

However, the prior techniques for performing Bayesian optimization can be inefficient. For example, the prior techniques can include manually choosing and executing a single acquisition function, which may not be the most efficient or best-suited acquisition function. Additionally, the use of the single acquisition function can render the current techniques sensitive to bias or other suitable effects of the single acquisition function. The prior techniques can further be data inefficient due to disposing of data from each execution of the computation model prior finding a final, optimized solution for the high-cost computational objective functions.

Examples of the present disclosure can overcome one or more of the above-mentioned problems by using the data-efficient multi-acquisition strategy. For example, the different types of acquisition functions can lie along different points of an exploration vs exploitation spectrum. Exploration can refer to an acquisition function that searches unexplored or high uncertainty values to determine where to execute an objective function while exploitation can refer to an acquisition function that searches favorable or low uncertainty values. Therefore, for instance, the probability of improvement acquisition function can be a more exploitive acquisition function as it involves determining a point with the highest probability of improving the accuracy for the computation model, while the model variance acquisition function can be a more exploratory acquisition function as it involves locating areas of uncertainty. In some examples, acquisition functions along different points of the exploration vs exploitation spectrum provide complementary information. For example, information obtained via a highly exploratory acquisition function can complement information from a highly exploitive acquisition function. Thus, the data-efficient multi-acquisition strategy can include executing more than one acquisition function in parallel and determining where to evaluate the high-cost computation objective function next based on a combination of information from the more than one acquisition function. This can provide a more efficient solution for selecting the high-cost computational objective functions. For example, a number of high-cost computational objective function evaluations for achieving a desired level of level of optimization (e.g., achieving a sufficiently low uncertainty for the input parameters) can be reduced. Additionally, the use of multiple acquisition functions can mitigate bias or other adverse effects associated with using a singular acquisition function, thereby providing a less sensitive method of performing Bayesian optimization than the current techniques.

The data-efficient multi-acquisition strategy can further provide a more data-efficient solution than prior techniques by using data from high-cost computation objective function evaluations to generate a surrogate model. For example, the data-efficient multi-acquisition strategy can use proper orthogonal decomposition (POD) to generate a POD surrogate model. The POD can be a technique in which latent structures can be identified based on the data from the high-cost computational objective function evaluations and leveraged to provide computationally inexpensive predictions of outputs of the computation model. Due to the surrogate model being computationally inexpensive to execute, the surrogate model can be implemented as a deterministic, exploitative acquisition function. For example, outputs of the computation model predicted by the surrogate model can be used to estimate an objective function gradient for the high-cost computational objective functions. Additionally, the surrogate model can be used as a low-fidelity information source to assist in determining values for the high-cost computational objective functions, thereby causing the data-efficient multi-acquisition strategy to perform a multi-fidelity strategy rather than a standard single-fidelity Bayesian optimization strategy. Therefore, in addition to using the data more efficiently, the surrogate model can further improve the efficiency of optimization via the data-efficient multi-acquisition strategy.

In some examples, an algorithm for performing the data-efficient multi-acquisition strategy can include establishing an initial, sparse sampling of an objective function domain, by, for example, establishing a set of seed input parameters for the computation model. The algorithm can also include generating a corresponding objective function observation. For example, the corresponding objective function observation can be an output of executing the computation model with the set of seed input parameters. The output of the computational model can be referred to as high-fidelity information. Additionally, the algorithm can include using the output to generate the surrogate model. The algorithm can further include establishing a dense sampling of the surrogate model relative to the high-fidelity information sample size. The dense sampling of the surrogate model can be referred to as low-fidelity information. Thus, low-fidelity data sets and high-fidelity data sets can be obtained and used to generate a multi-fidelity Gaussian process regression (MFGP). The algorithm can further include using the MFGP to run probabilistic acquisition function maximizations, which can produce recommended values at which an objective function can be further evaluated. The recommended values may range in purpose from purely explorative to purely exploitative. Additionally, the algorithm can involve using the surrogate model to run a global optimization scheme. The global optimization scheme may produce an additional, exploitative recommended value for the objective function. Then, the algorithm can include evaluating the objective function at the recommended values and appending the high-fidelity information with the resulting data. Additionally, in some examples, the steps of the algorithm after the generation of the surrogate model can be repeated until an optimized solution of the objective function is found.

Some embodiments of the invention are related to a method of optimizing input parameters for an industrial process. The method can include providing a computation model of an industrial process having an input parameter. The method can also include executing, in a first step, the computation model on a value for the parameter generated by a first acquisition function and on a value for the parameter generated by a second acquisition function. The first and second acquisition functions can be different types of Bayesian acquisition functions from one another. Additionally, the method can include determining that the computation model has finished executing on each of the parameters and outputting to a pool of data. The method can further include directing, after the computation model has finished executing and outputting, the first and second Bayesian acquisition functions to analyze the pool of data, including data associated with each acquisition function's parameter values. The method can also include executing, in a second step, the computation model on values for the parameter generated by the first acquisition function and the second acquisition function and selecting a best input parameter from among the values generated by the first and second types of Bayesian acquisition functions.

In some embodiments, the types of Bayesian acquisition functions can be selected from the group consisting of an expected improvement acquisition function, a probability of improvement acquisition function, a negative lower confidence bounds acquisition function, and a model variance acquisition function. Additionally, the first Bayesian acquisition function can be the expected improvement acquisition function, and the second Bayesian acquisition function can be the model variance acquisition function.

In some embodiments, the method can include, in the second or a subsequent step, that the first acquisition function generates a value for the parameter based on data from executing the computation model on a value generated from the second acquisition function. The method can further include setting the input parameter on a physical component that performs the industrial process.

Some embodiments of the invention are related to a method of optimizing input parameters for an industrial process. The method can include executing a computational model of an industrial process using seed input parameters to generate a first output, the seed input parameters and first output forming a first data set. The method can also include applying a first Bayesian acquisition function to the first data set to generate a second input parameter and then executing the computation model using the second input parameter to generate a second data set. The method can further include applying a second Bayesian acquisition function to the first data set to generate a third input parameter and then executing the computation model using the third input parameter to generate a third data set. The first and second Bayesian acquisition functions can be different types of Bayesian acquisition functions from one another. Additionally, the method can include allowing the first and second Bayesian acquisition functions to analyze the first, second, and third data sets. The method can include running the first Bayesian acquisition function based on data from the third data set generated by the second Bayesian acquisition function to generate a fourth input parameter and then executing the computation model using the fourth input parameter to generate a fourth data set. The method can include running the second Bayesian acquisition function based on data from the second or third data set to generate a fifth input parameter and then executing the computational model using the fifth input parameter to generate a fifth data set. The method can further include selecting a best input parameter from among an output from the first and second types of Bayesian acquisition functions.

In some embodiments the method can include running the second Bayesian acquisition function based on data from the second data set generated by the first Bayesian acquisition function.

In some embodiments, the method can further include allowing the first and second Bayesian acquisition functions to analyze the first, second, third, fourth, and fifth data sets and running the first Bayesian acquisition function based on data from the fourth data set generated by the first Bayesian acquisition function.

The data sets can include target output defined by an objective function as well as field data that is auxiliary to the target output and that the first and second Bayesian acquisition functions rely upon the field data for generating input parameters. The first and second Bayesian acquisition functions can continue to generate input parameters, and the computation model can be executed with the input parameters, until a number of iterations is completed, compute power budget is reached, or a target output defined by an objective function reaches a target.

The first Bayesian acquisition function may not be allowed to analyze the data sets until the computation model has completed execution using input parameters from all other Bayesian acquisition functions.

In some embodiments, the method can include setting the input parameter on a physical component that performs the industrial process.

DETAILED DESCRIPTION

Figure 1:
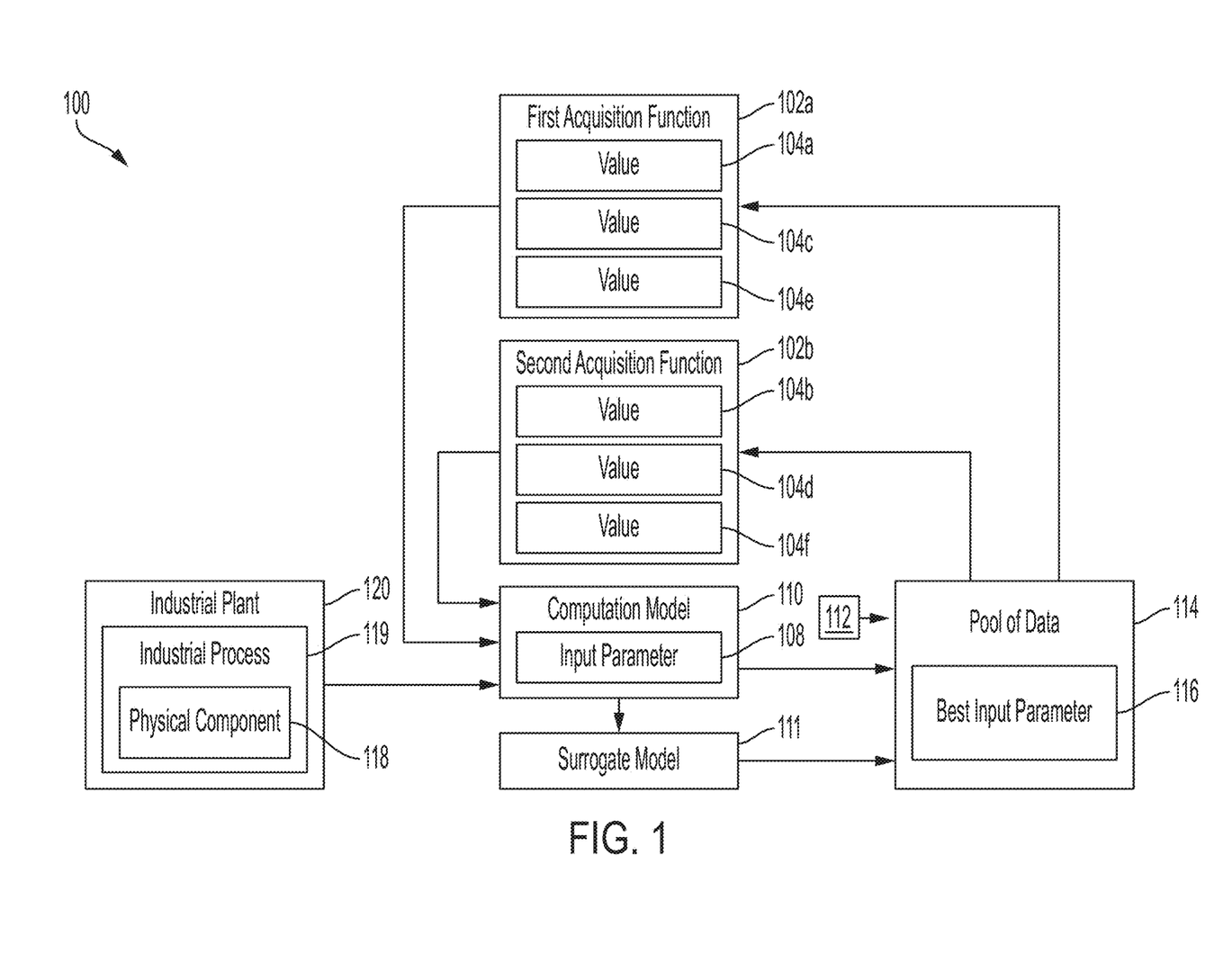
FIG. 1 is a block diagram of an example of a system for optimizing input parameters for an industrial process according to one example of the present disclosure.

FIG. 1 is a block diagram of an example of a system 100 for optimizing input parameters for an industrial process 119 according to one example of the present disclosure. The system 100 can provide a computation model 110, which can be a digital model or digital twin of an industrial plant 120. In some examples, the industrial plant 120 can be a water distribution system, a chemical plant, a metal manufacturing plant, a food processing plant, or another suitable industrial plant. Thus, the computation model 110 can be a virtual representation of the industrial plant 120 or a virtual representation of specific processes (e.g., industrial process 119) or systems associated with the industrial plant 120.

In a particular example, the computation model 110 can be a heat transfer model of a wafer in semiconductor fabrication. Thus, the industrial plant 120 can be a semiconductor fabrication plant and the industrial process 119 can be semiconductor fabrication. In some examples, the industrial process 119 can be or can include subprocesses of semiconductor fabrication such as deposition, exposure, etching, packaging, or other suitable subprocesses. Additionally, the industrial process 119 can have an input parameter 108. The input parameter 108 can be a controllable parameter, such as a temperature set for a physical component 118 involved in the industrial process 119, or the input parameter 108 can be an unknown parameter, which can be estimated using experimental data and may be a function of one or more known or controllable parameters.

In the particular example, the input parameter 108 can be an unknown parameter associated with temperature of the wafer. An objective of the system 100 can be to optimize the input parameter 108 by comparing an experimentally determined temperature parameter to a corresponding output of the computation model 110. A relationship between the input parameter 108 and output 112 of the computational model 110 can be defined by an objective function. The computation model 110 can be computationally expensive and therefore may take at least thirty minutes, two hours, or more to execute. The computational model 110 may further generate vast datasets at each execution. Due to computation model being computationally expensive and generating vast datasets, the objective function can be expensive to evaluate, a derivative of the objective function can be infeasible to calculate, or a combination thereof. Thus, to efficiently optimize the input parameter the system 100 can execute a data-efficient multi-acquisition strategy.

To execute the data-efficient multi-acquisition strategy, the system 100 can execute, in a first step, the computation model 110 on a first value 104a for the input parameter 108. The first value 104a can be generated by a first acquisition function 102a after a first run of the computational model with a seed run. Additionally, the system 100 can execute the computation model 110 on a second value 104b for the input parameter 108 generated by a second acquisition function 102b. The acquisition functions 102a-b can be different types of Bayesian acquisition functions. For example, the first acquisition function 102a can be an expected improvement acquisition function and the second acquisition function 102b can be a model variance acquisition function. The expected improvement acquisition function can generate the first value 104a by determining that the first value 104a is associated with a highest expected improvement of the output 112 of the computation model 110. The model variance acquisition function can generate the second value 104b by determining that the second value 104b is associated with an area with high uncertainty at which exploration may provide useful information for optimization of the input parameter 108. The acquisition functions 102a-b being different types of Bayesian acquisition functions can improve optimization of the input parameter 108 as each of the acquisition functions 102a-b can have different strategies for generating values. For example, the first acquisition function 102a can be highly exploitive as it locates points at which the output 112 can be most improved. In contrast, the second acquisition function 102b can be highly exploratory as it can locate values for which little information is known (i.e., values with high uncertainty). Therefore, as an example, values located by the second acquisition function 102b can be used to improve exploration of the first acquisition function 102a to increase the likelihood and efficiency of finding an optimal solution for the input parameter 108. Additional examples of acquisition functions can include a probability of improvement acquisition function, an upper confidence bound acquisition function, a negative lower confidence bound acquisition function, or other suitable acquisition functions.

The system 100 may further determine that the computation model 110 has finished executing with the first value 104a, by reacting to an event, timer, or other means, and can transmit the output 112 of the computation model 110 to a pool of data 114. The system 100 can also determine that the computation model 110 has finished executing with the second value 104b and can also transmit the output 112 of the computation model 110 executing with the second value 104b to the pool of data 114. The pool of data 114 may further include data associated with each acquisition function's 102a-b parameter values. For example, the pool of data 114 may include uncertainties, probabilities or expected amounts of improvement, confidence intervals, etc. associated with values generated by the acquisition functions 102a-b.

The system 100 can also, after executing the computation model 110 and transmitting the output 112, direct the acquisition functions 102a-b to analyze data saved in the pool of data 114. The pool of data 114 can include the output 112 associated with the first value 104a, the output 112 associated with the second value 104b, the data associated with each acquisition function's 102a-b parameter values, other suitable data, or a combination thereof. Analyzing the data saved in the pool of data 114 can include the acquisition functions 102a-b determining where to execute the computation model 110 based on a cumulation of data in the pool of data 114. Therefore, analyzing the data saved in the pool of data 114 can enable the acquisition functions 102a-b to generate additional values for the input parameter 108. In some examples, the additional values can be increasingly optimized values for the input parameter 108.

Additionally, in subsequent steps, the system 100 can execute the computation model 110 on a third value 104c generated by the first acquisition function 102a, a fourth value 104d generated by the second acquisition function 102b, a fifth value 104e generated by the first acquisition function 102a, and a sixth value 104f generated by the second acquisition function 102b. At each of the subsequent steps, additional data (e.g., output 112) can be saved to the pool of data 114 and analyzed by the acquisition functions 102a-b. For example, the generation of the fifth value 104e by the first acquisition function 102a can be based on data in the pool of data 114 associated with values 104a-d. That is, there is mixing of the data from runs with different types of acquisition functions.

Thus, for each generation of a value and subsequent executing of the computation model 102 and outputting to the pool of data 114, the system 100 may be further optimizing the input parameter 108. Additionally, the acquisition functions 102a-b can be executed in parallel to decrease a time for performing the optimization or to decrease a number of executions of the computation model 110 required to optimize the input parameter 108. In some examples, the time or the number of executions can further be decreased by the use of a surrogate model 111. For example, the output 112 of the computational model 110 for the first value 104a and the second value 104b can be used by the system 100 to generate the surrogate model 111. Then, the system 100 can predict outputs of the computational model 110 using surrogate model 111, which can be less computationally expensive than the computation model 110.

"Parallel" execution includes explicitly executing at the same time or executing at different times but functionally treating as if the executions were conducted in parallel, such as by running one and then the other and then sharing the outputs as if they had been run in parallel, or as otherwise known in the art. The term can include executing on different processors/cores or the same processor by multiplexing/interleaving in time.

In some examples, the system 100 may stop running the acquisition functions 102a-b and executing the computation model 110 after a certain number of values are generated, after a certain number of executions of the computation model 110, after a compute power budget is reached from executing the computation model 110, or another suitable reason. Then, the system 100 can select a best input parameter 116 from among the values 104a-f generated by the acquisition functions 102a-b. The system 100 may select the best input parameter 116 based on an accuracy of the output 112 of the computational model compared to experimental data exceeding an accuracy threshold, the output 112 having an uncertainty below an uncertainty threshold, or otherwise satisfying one or more requirements for optimization which may be specified by a user.

Figure 2:
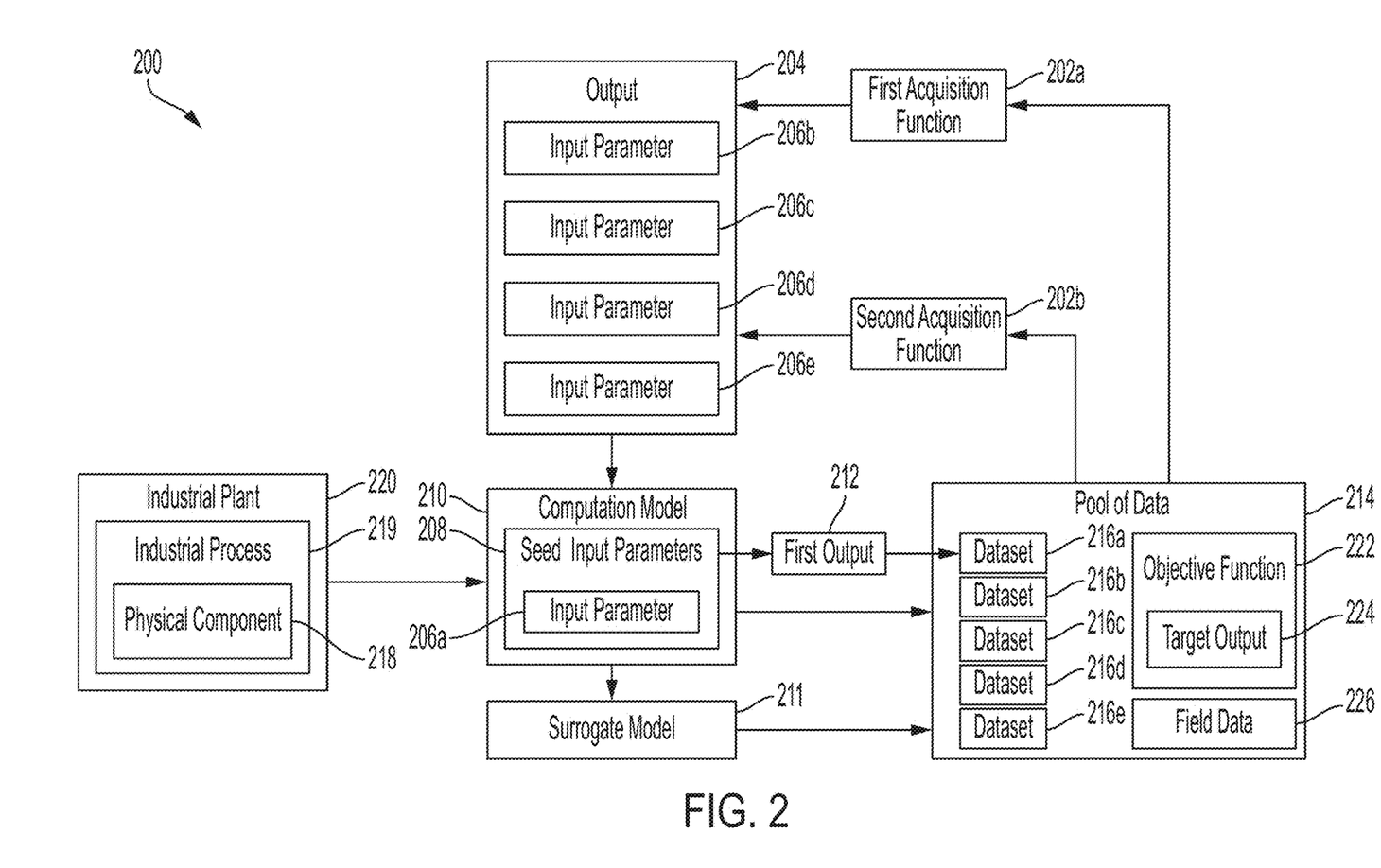
FIG. 2 is a block diagram of another example of a system for optimizing input parameters for an industrial process according to one example of the present disclosure.

FIG. 2 is a block diagram of another example of a system 200 for optimizing input parameters for an industrial process 219 according to one example of the present disclosure. The system 200 can include a computation model 210, which can be a digital model or digital twin of an industrial plant 220. The computational model 210 can be computationally expensive to execute, produce large datasets, or a combination thereof. The industrial plant 220 can be a semiconductor fabrication plant, a water distribution system, a chemical plant, a metal manufacturing plant, a food processing plant, or another suitable industrial plant. Thus, the computation model 210 can be a virtual representation of the industrial plant 220 or a virtual representation of specific processes (e.g., industrial process 219) or systems associated with the industrial plant 220.

The computation model 210 can include an input parameter, which can be a mathematical representation of one or more components (e.g., physical component 218) associated with the industrial process 219. A relationship between the input parameter and output of the computational model 210 can be defined by an objective function 222. Due to computation model 210 being computationally expensive and generating vast datasets, the objective function 222 can be expensive to evaluate, a derivative of the objective function 222 can be infeasible to calculate, or a combination thereof. Thus, to efficiently optimize the input parameter the system 200 can execute a data-efficient multi-acquisition strategy, in which the system 200 may optimize the input parameter by comparing experimentally collected data to corresponding outputs of the computation model 210. For example, the input parameter can be a surface emissivity value of the physical component 218. Additionally, the input parameter can be a function of a controllable parameter, such as a wattage of a heater. Therefore, the experimentally collected data may indicate that at 500 Watts the surface emissivity value of the physical component 218 can be 0.7 and at 200 Watts the surface emissivity value of the physical component can be 0.6.

To begin optimization of the input parameter, the system 200 can perform a number of (e.g., ten) initial simulations with various values for wattage to generate seed input parameters 208 or the seed input parameters may be estimated based on the experimentally collected data. Then, the system 200 may execute the computation model 210 using a first input parameter 206a of the seed input parameters 208 to generate a first output 212. The first output 212 and the seed input parameters 208 can form a first data set 216a. The first data set 216a can be high-fidelity information and can be saved to a pool of data 214.

Additionally, the system 200 can apply a first acquisition function 202a to the first data set 216a to generate a second input parameter 206b. The system 200 can also apply a second acquisition function 202b to the first data set 216a to generate a third input parameter 206c. Then, the system 200 can execute the computation model 210 using the second input parameter 206b to generate a second dataset 216b and can execute the computation model 210 using the third input parameter 206c to generate a third dataset 216c. The acquisition functions 202a-b can be different types of Bayesian acquisition functions. The types of Bayesian acquisition functions can include an expected improvement acquisition function, a probability of improvement acquisition function, a negative lower confidence bounds acquisition function, a model variance acquisition function, or other suitable acquisition functions. In a particular example, the first acquisition function 202a can be the expected improvement acquisition function and the second acquisition function 202b can be the model variance acquisition function.

The system 200 can further run the first acquisition function 202a based on data from the third dataset 216c generated by the second acquisition function 202b to generate a fourth input parameter 202d. Then, the system 200 can execute the computation model 210 using the fourth input parameter 206d to generate a fourth dataset 216d. The system 200 can also run the second acquisition function 202b based on data from the second dataset 216b or the third dataset 216c to generate a fifth input parameter 206e. Then, the system 200 can execute the computational model 210 using the fifth input parameter 206e to generate a fifth dataset 216e.

Additionally or alternatively, the seed input parameters 208, one or more of the datasets 216a-e, other suitable data, or a combination thereof can be used to construct a surrogate model 211. For example, proper orthogonal decomposition (POD) can be a technique for reducing the complexity of the computation model 210 by generating a relatively dense set of data (i.e., low-fidelity dataset) from the first dataset 216a. The POD may further include mapping the seed inputs parameters 208 or input parameters 206a-e to predicted outputs of the computational model 210 based on the low-fidelity dataset. Therefore, the surrogate model 211 can be a simplified representation of the computation model 210 for predicting outputs of the computation model 210. The surrogate model 211 may also be used to perform a global optimization scheme. In some examples, the surrogate model 211 can generate values for the input parameter based on the global optimization scheme, thereby acting as an exploitive acquisition function. Moreover, the use of the surrogate model 211 and the computation model 210 (i.e., low-fidelity information and high-fidelity information) can be combined to generate a multi-fidelity Gaussian process regression (MFGP). The MFGP can increase the accuracy of the system 200 predicting outputs of the computational model 210. Therefore, the input parameters 206a-d or other suitable values generated by acquisition functions 202a-b can be further evaluated via the surrogate model 211, the MGFP, or a combination thereof prior to execution at the computational model 210.

Additionally, in some examples, the datasets 216a-e can include a target output 224 defined by the objective function 222. The target output 224 can be defined as a solution for the objective function 222 that exceeds an accuracy threshold or otherwise indicates a solution for the objective function 222 has been found. The datasets 216a-e may further include field data 226, such as wattage or other suitable field data associated with the industrial process 219. The field data 226 can be auxiliary to the target output 224.

In some examples, the system 200 may continue to run the acquisition functions 202a-b and execute the computation model 210 until the target output 224 defined by the objective function 222 is reached. In other examples, the system may continue to run the acquisition functions 202a-b and execute the computation model 210 for a certain number of iterations, until a compute power budget for the computation model 210 is reached or exceeded, or until another suitable requirement is satisfied. After one or more requirements is satisfied, the system 100 can select a best input parameter from among an output 204 of the acquisition functions 202a-b. The best input parameter can be the input parameter associated with the target output 224. In some examples, the best input parameter can be associated with a most accurate output of the computation model 210 in comparison with the experimentally collected data, associated with a lowest uncertainty, or otherwise an optimal solution for the objective function 222.

Figure 3:
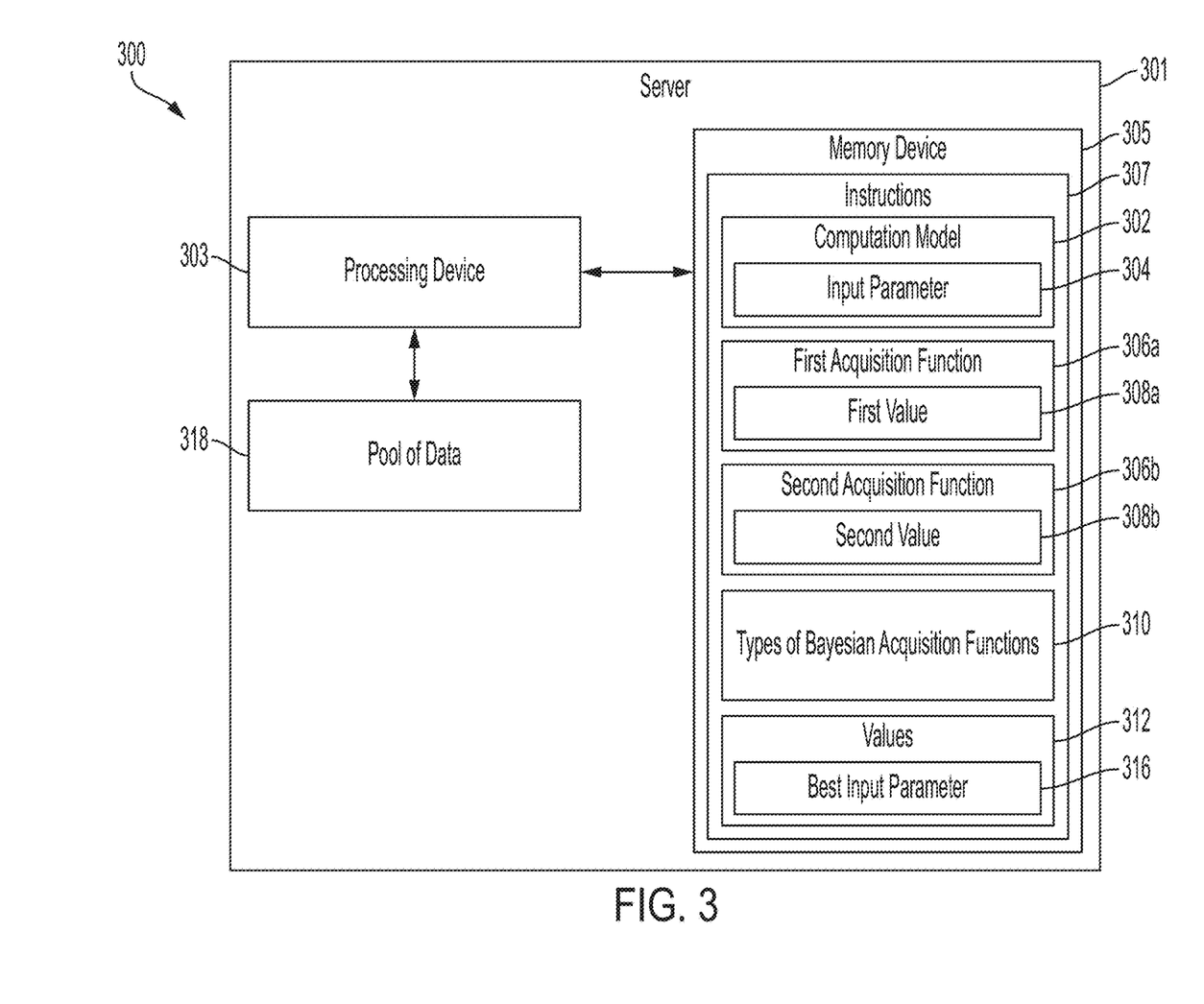
FIG. 3 is a block diagram of an example of a computing system for optimizing input parameters for an industrial process according to one example of the present disclosure.

FIG. 3 is a block diagram of an example of a computing system for optimizing input parameters for an industrial process according to one example of the present disclosure. The computing system 300 includes a processing device 303 that is communicatively coupled to a memory device 305. In some examples, the processing device 303 and the memory device 305 can be part of the same computing device, such as the server 301. In other examples, the processing device 303 and the memory device 305 can be distributed from (e.g., remote to) one another.

The processing device 303 can include one processor or multiple processors. Non-limiting examples of the processing device 303 include a Field-Programmable Gate Array (FPGA), an application-specific integrated circuit (ASIC), or a microprocessor. The processing device 303 can execute instructions 307 stored in the memory device 305 to perform operations. The instructions 307 may include processor-specific instructions generated by a compiler or an interpreter from code written in any suitable computer-programming language, such as C, C++, C #, Java, or Python.

The memory device 305 can include one memory or multiple memories. The memory device 305 can be volatile or non-volatile. Non-volatile memory includes any type of memory that retains stored information when powered off. Examples of the memory device 305 include electrically erasable and programmable read-only memory (EEPROM) or flash memory. At least some of the memory device 305 can include a non-transitory computer-readable medium from which the processing device 303 can read instructions 307. A non-transitory computer-readable medium can include electronic, optical, magnetic, or other storage devices capable of providing the processing device 303 with computer-readable instructions or other program code. Examples of a non-transitory computer-readable medium can include a magnetic disk, a memory chip, ROM, random-access memory (RAM), an ASIC, a configured processor, and optical storage.

The processing device 303 can execute the instructions 307 to perform operations. For example, the processing device 303 can provide a computation model 302 of an industrial process having an input parameter 304. The processing device 303 can also execute, in a first step, the computation model 302 on a first value 308a for the parameter 304 generated by a first acquisition function 306a and on a second value 308b for the parameter 304 generated by a second acquisition function 306b. The first acquisition function 306a and the second acquisition function 306b can be different types of Bayesian acquisition functions. Additionally, the processing device 303 can determine that the computation model 302 has finished executing on each of the parameters and can output to a pool of data 318. The processing device 303 can direct, after the computation model 210 has finished executing and outputting, the first acquisition function 306a and the second acquisition function 306b to analyze the pool of data 318. The pool of data 308 can include, in addition to the output of the computation model 302, data associated with each acquisition function's parameter values. The processing device 303 can further execute, in a second step, the computation model 302 on values 312 for the parameter generated by the first acquisition function 306a and the second acquisition function 306b and can select a best input parameter 316 from among the values 312 generated by the acquisition functions 308a-b.

Figure 4:
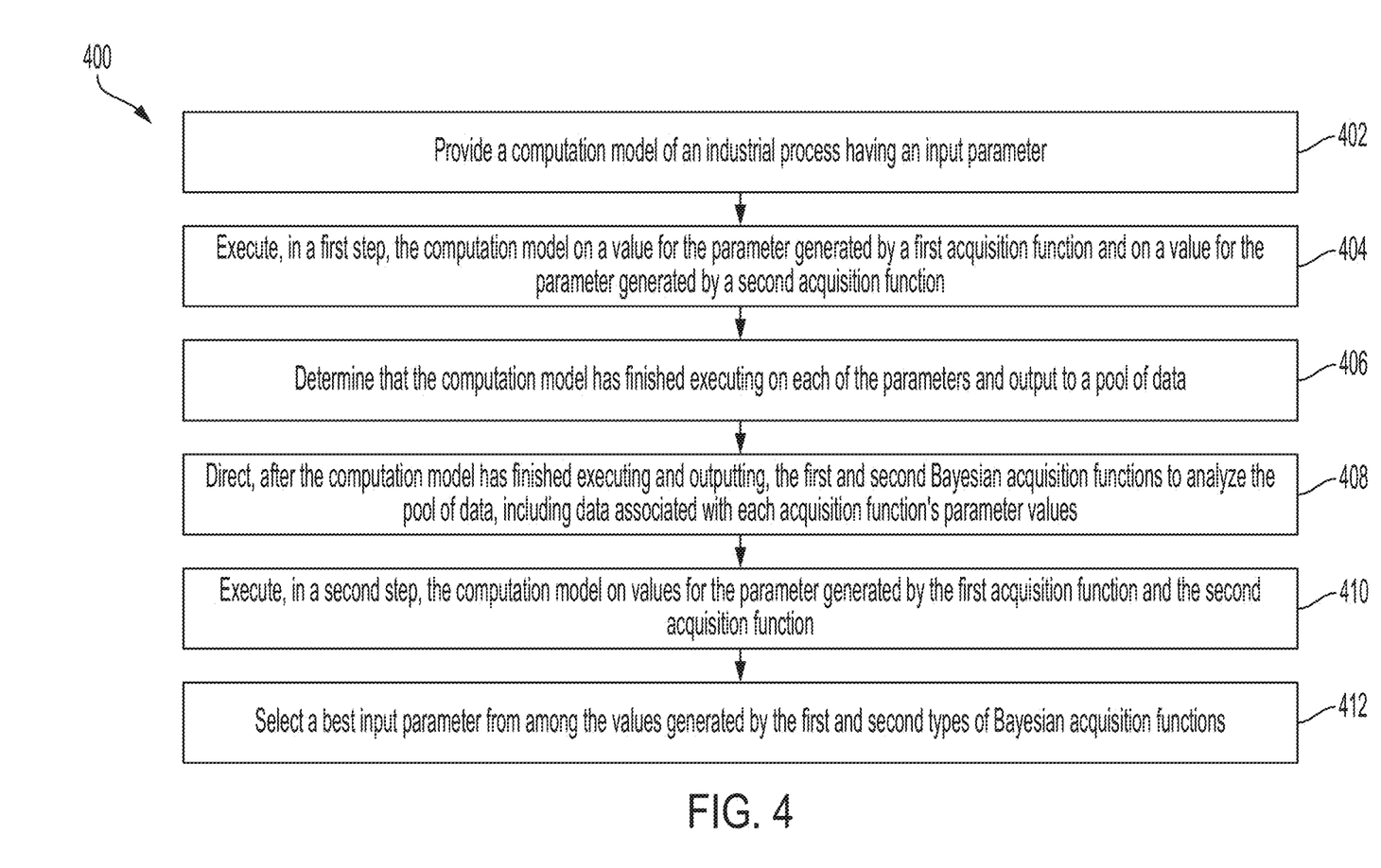
FIG. 4 is a flowchart of an example of a process for optimizing input parameters for an industrial process according to one example of the present disclosure.

FIG. 4 is a flowchart of an example of a process for optimizing input parameters for an industrial process according to one example of the present disclosure. In some examples, the processing device 303 (in FIG. 3) can implement some or all of the steps shown in FIG. 4. Other examples can include more steps, fewer steps, different steps, or a different order of the steps than is shown in FIG. 4. The steps of the figure are discussed below with reference to the components discussed above in relation to FIGS. 1 and 3.

At block 402, the processing device 303 (see FIG. 3) can provide a computation model 110 (see FIG. 1) of an industrial process 119 having an input parameter 108. The computation model 110 can be computationally expensive, can output large datasets, or a combination thereof. Additionally, there can be little prior information or knowledge of a best suited or most efficient acquisition function for the computation model 110 or a single acquisition function may not be sufficient for optimizing the input parameter 108 for the computation model 110. In some examples, the input parameter 108 can be a known or controllable parameter. For example, the input parameter 108 can be wattage and can be set on a physical component 118 such as a heater, that can perform the industrial process 119 or can perform at least one portion or step of the industrial process 119. Additionally or alternatively, the input parameter 108 can be an unknown parameter that may be estimated using experimental data. For example, the input parameter 108 can be surface emissivity of the physical component 118.

At block 404, the processing device 303 can execute, in a first step, the computation model 110 on a first value 104a for the input parameter 108 generated by a first acquisition function 102a and on a second value 104b for the input parameter 108 generated by a second acquisition function 102b. The acquisition functions 102a-b can be different types of Bayesian acquisition functions from one another. For example, the first acquisition function 102a can be an expected improvement acquisition function and the second acquisition function 102b can be a model variance acquisition function. Additional examples of types of Bayesian acquisition functions can include a probability of improvement acquisition function, a negative lower confidence bound acquisition function, an entropy search acquisition function, an upper confidence bound acquisition function, or other suitable acquisition functions.

At block 406, the processing device 303 can determine that the computation model 110 has finished executing on each of the parameters and output to a pool of data 114. Therefore, the pool of data 114 can include an output 112 of the computation model 110 for the first value 104a and an output 112 of the computation model 110 for the second value 104b. The pool of data 114 may further include data associated with each acquisition function's 102a-b parameter values. For example, the pool of data 114 may include uncertainties, probabilities or expected amounts of improvement, confidence intervals, etc. associated with values generated by the acquisition functions 102a-b.

At block 408, the processing device 303 can direct, after the computation model 110 has finished executing and outputting, the first and second Bayesian acquisition functions 102a-b to analyze the pool of data 114, including data associated with each acquisition function's parameter values. Analyzing the data saved in the pool of data 114 can include the acquisition functions 102a-b determining where to execute the computation model 110 based on a cumulation of data in the pool of data 114. Therefore, analyzing the data saved in the pool of data 114 can enable the acquisition functions 102a-b to generate additional values for the input parameter 108. In some examples, the additional values can be increasingly optimized values for the input parameter 108. Additionally, in some examples, the processing device 303 may not allow the first or second acquisition functions 102a-b to analyze the data until the computation model 110 has completed execution with input parameters from all other acquisition functions.

At block 410, the processing device 303 can execute, in a second step, the computation model 110 on values for the input parameter 108 generated by the first acquisition function 102a and the second acquisition function 102b. In some examples, the first acquisition function 102a can generate a value for the input parameter 108 based on data from executing the computation model 210 on a value generated from the second acquisition function 102b or vice versa. For example, the second acquisition function 102b can locate a first value with high uncertainty (i.e., a value for which little information has been collected). Data from executing the computation model 110 with the first value can indicate an improvement to an output 112 of the computation model 110. Therefore, the first acquisition function 102a can determine a second value with a high expected improvement based on the first value. The first acquisition function 102a may not have found the second value or may have taken more iterations to find the second value without the data from executing the computation model on the first value generated by the second acquisition function 102b.

At block 412, the processing device 303 can select a best input parameter 116 from among the values generated by the first and second types of Bayesian acquisition functions. The best input parameter 116 may yield a most accurate output for the computation model 110 or may otherwise be an optimized input parameter. In some examples, the best input parameter 116 can be associated with a target output. The target output can be defined by an objective function as being an optimized solution for the objective function. A target for the target output can be a sufficiently high accuracy for the computation model 110 in comparison to experimental data, a sufficiently low uncertainty of the target output, etc.

Additionally or alternatively, the processing device 303 may continue to direct the acquisition functions 102a-b to generate input parameters and continue to execute the computation model 110 with the input parameters, until a number of iterations is completed, a computer power budget is reached, or a target output defined by an objective function reaches a target. Therefore, in some examples, the selection of the best input parameter 116 may occur after a number of iterations is completed, a computer power budget is reached, or a target output is reached.

Figure 5:
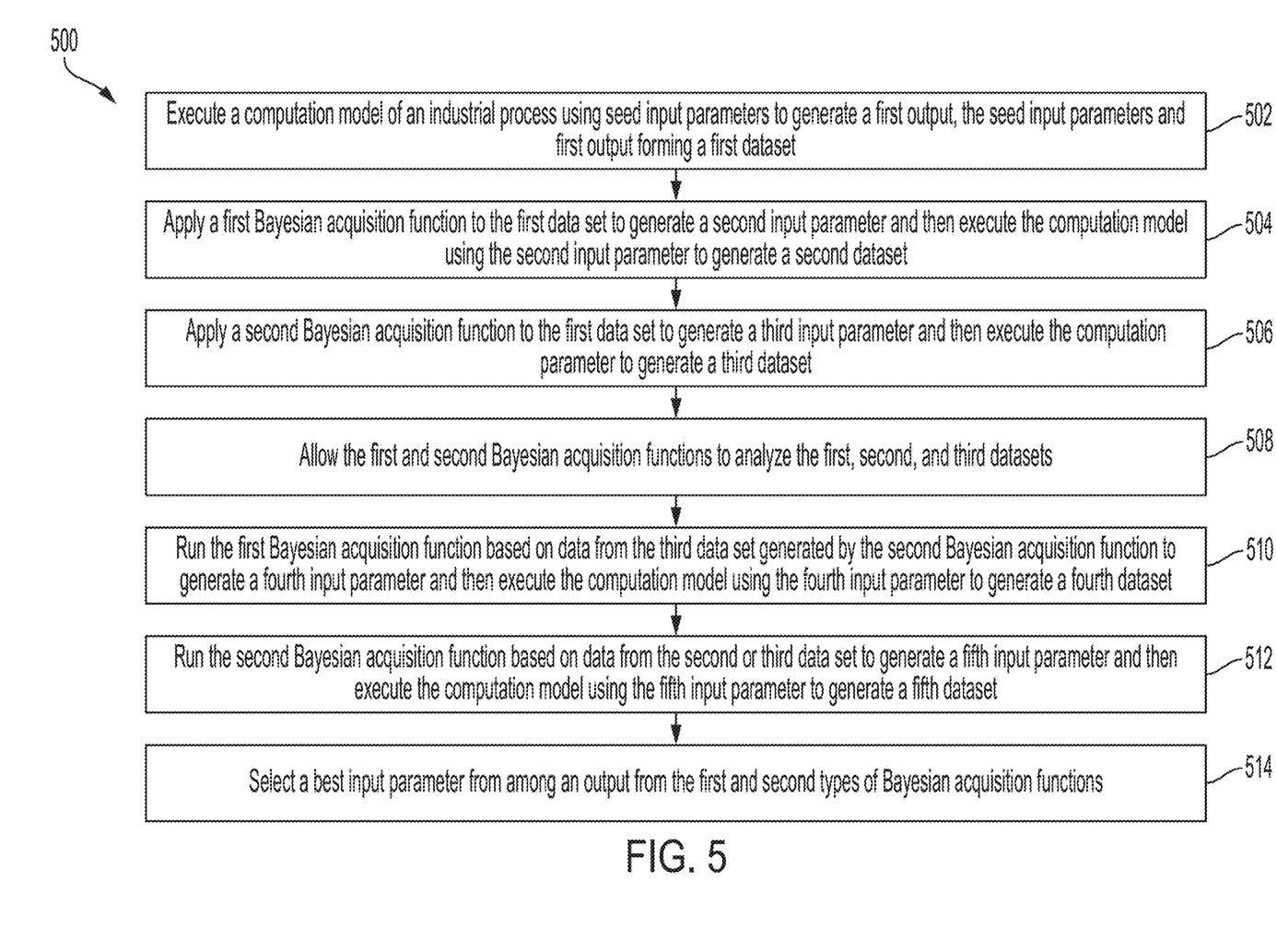
FIG. 5 is a flowchart of another example process for optimizing input parameters for an industrial process according to one example of the present disclosure.

FIG. 5 is a flowchart of another example process for optimizing input parameters for an industrial process according to one example of the present disclosure. In some examples, the processing device 303 (in FIG. 3) can implement some or all of the steps shown in the figure. Other examples can include more steps, fewer steps, different steps, or a different order of the steps than is shown in the figure. The steps of the figure are discussed below with reference to the components discussed above in relation to FIGS. 2 and 3.

At block 502, the processing device 303 (see FIG. 3) can execute a computation model 210 (see FIG. 2) of an industrial process 219 using seed input parameters 208 to generate a first output 212, the seed input parameters 208 and first output 212 forming a first dataset 216a. The computation model 210 can be computationally expensive, can output large datasets, or a combination thereof. In some examples, the seed input parameters 208 can be unknown parameters estimated based on experimental data, historical data, a simulation, or other suitable data or techniques for estimating parameters or the seed input parameters 208 can be controllable or known input parameters. Additionally, in some examples, the seed input parameters 208, the first dataset 216a, or a combination thereof can be used to generate a surrogate model 211.

At block 504, the processing device 303 can apply a first Bayesian acquisition function 202a to the first data set 216a to generate a second input parameter 206b and then execute the computation model 210 using the second input parameter 206b to generate a second dataset 216b. The first acquisition function 202a can be chosen from a group of acquisition functions that can consist of an expected improvement acquisition function, a probability of improvement acquisition function, a negative lower confidence bounds acquisition function, a model variance acquisition function, other suitable acquisition functions, or a combination thereof. In a particular example, the first acquisition function 202a can be the expected improvement acquisition function.

At block 506, the processing device 303 can apply a second Bayesian acquisition function 202 to the first data set 216a to generate a third input parameter 206c and then execute the computation model 210 using the second input parameter 206b to generate a third dataset 216c. The second acquisition function 202b can also be chosen from a group of acquisition functions that can consist of an expected improvement acquisition function, a probability of improvement acquisition function, a negative lower confidence bounds acquisition function, a model variance acquisition function, other suitable acquisition functions, or a combination thereof. In a particular example, the second acquisition function 202b can be the model variance acquisition function.

At block 508, the processing device 303 can allow the first and second Bayesian acquisition function 202a-b to analyze the first, second, and third datasets 216a-c. In some examples, the first acquisition function 202a or the second acquisition function 202b may not be allowed to analyze the datasets 216a-c until the computation model 210 has completed execution using input parameters from all other Bayesian acquisition functions.

At block 510, the processing device 303 can run the first Bayesian acquisition function based on data from the third data set generated by the second Bayesian acquisition function to generate a fourth dataset. Additionally, the processing device 303 may run the first acquisition function 202a based on data from the fourth dataset 216d generated by the first Bayesian acquisition function 202a.

At block 512, the processing device 303 can run the second Bayesian acquisition function based on data from the second or third data set to generate a fifth input parameter and then execute the computation model 210 using the fifth input parameter to generate a fifth data set. In an example, running the second acquisition function 202b can be based on data from the second dataset 216b generated by the first Bayesian acquisition function 202a. Additionally or alternatively, the processing device 303 may further allow the first and second Bayesian acquisition functions 202a-b to analyze the first, second, third, fourth, and fifth datasets 216a-e.

At block 514, the processing device 303 can select a best input parameter from among an output 204 of the first and second types of Bayesian acquisition functions 202a-b. The best input parameter may yield a most accurate output for the computation model 210 or may otherwise be an optimized input parameter. In some examples, the best input parameter can be associated with a target output 224 defined by an objective function 222 as an optimized solution for the objective function 222. A target for the target output 224 can be a sufficiently high accuracy for output of computation model 210 in comparison to experimental data, a sufficiently low uncertainty associated with the target output, etc.

Additionally or alternatively, the datasets 216a-e may include field data 226 that can be auxiliary to the target output 224. The first and second Bayesian acquisition functions 202a-b may rely upon the field data 226 for generating input parameters. The processing device 303 may continue to generate input parameters and execute the computation model 210 with the input parameters, until a number of iterations is completed, a compute power budget is reached, or the target output 224 reaches the target.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" in reference to a temperature or other engineering units includes measurements or settings that are within ±1%, ±2%, ±5%, ±10%, or other tolerances of the specified engineering units as known in the art.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of optimizing input parameters for an industrial process, the method comprising:
    executing a computation model of an industrial process using seed input parameters to generate a first output, the seed input parameters and first output forming a first data set;
    applying a first Bayesian acquisition function to the first data set to generate a second input parameter and then executing the computation model using the second input parameter to generate a second data set;
    applying a second Bayesian acquisition function to the first data set to generate a third input parameter and then executing the computation model using the third input parameter to generate a third data set, wherein the first and second Bayesian acquisition functions are different types of Bayesian acquisition functions from one another;
    using the first and second Bayesian acquisition functions to analyze the first, second, and third data sets;
    running the first Bayesian acquisition function based on data from the third data set generated by the second Bayesian acquisition function to generate a fourth input parameter and then executing the computation model using the fourth input parameter to generate a fourth data set;
    running the second Bayesian acquisition function based on data from the second or third data set to generate a fifth input parameter and then executing the computational model using the fifth input parameter to generate a fifth data set; and
    selecting a best input parameter from among an output from the first and second types of Bayesian acquisition functions, wherein the output comprises the first, second, third, fourth, or fifth input parameter; and
    setting the best input parameter on a physical component that performs the industrial process.

2. The method of claim 1, wherein the types of Bayesian acquisition functions are selected from the group consisting of:
    an expected improvement acquisition function,
    a probability of improvement acquisition function,
    a negative lower confidence bounds acquisition function, and
    a model variance acquisition function.

3. The method of claim 2, wherein the first Bayesian acquisition function is the expected improvement acquisition function, and the second Bayesian acquisition function is the model variance acquisition function.

4. The method of claim 1 wherein running the second Bayesian acquisition function is based on data from the second data set generated by the first Bayesian acquisition function.

5. The method of claim 1 further comprising:
    using the first and second Bayesian acquisition functions to analyze the first, second, third, fourth, and fifth data sets; and
    running the first Bayesian acquisition function based on data from the fourth data set generated by the first Bayesian acquisition function.

6. The method of claim 1 wherein:
    the data sets include target output defined by an objective function as well as field data that is auxiliary to the target output; and
    the first and second Bayesian acquisition functions rely upon the field data for generating input parameters.

7. The method of claim 1 wherein the first and second Bayesian acquisition functions continue to generate input parameters, and the computation model is executed with the input parameters, until a number of iterations is completed, compute power budget is reached, or a target output defined by an objective function reaches a target.

8. The method of claim 7 wherein the first Bayesian acquisition function is not allowed to analyze the data sets until the computation model has completed execution using input parameters from all other Bayesian acquisition functions.

9. A non-transitory machine-readable tangible medium embodying information indicative of instructions for causing one or more machines to perform operations for optimizing input parameters for an industrial process, the instructions comprising:
    executing a computation model of an industrial process using seed input parameters to generate a first output, the seed input parameters and first output forming a first data set;
    applying a first Bayesian acquisition function to the first data set to generate a second input parameter and then executing the computation model using the second input parameter to generate a second data set;

applying a second Bayesian acquisition function to the first data set to generate a third input parameter and then executing the computation model using the third input parameter to generate a third data set, wherein the first and second Bayesian acquisition functions are different types of Bayesian acquisition functions from one another;

using the first and second Bayesian acquisition functions to analyze the first, second, and third data sets;

running the first Bayesian acquisition function based on data from the third data set generated by the second Bayesian acquisition function to generate a fourth input parameter and then executing the computation model using the fourth input parameter to generate a fourth data set;

running the second Bayesian acquisition function based on data from the second or third data set to generate a fifth input parameter and then executing the computational model using the fifth input parameter to generate a fifth data set;

selecting a best input parameter from among an output from the first and second types of Bayesian acquisition functions, wherein the output comprises the first, second, third, fourth, or fifth input parameter; and setting the best input parameter on a physical component that performs the industrial process.

10. The medium of claim 9, wherein the types of Bayesian acquisition functions are selected from the group consisting of:

an expected improvement acquisition function, a probability of improvement acquisition function, a negative lower confidence bounds acquisition function, and a model variance acquisition function.

11. The medium of claim 10, wherein the first Bayesian acquisition function is the expected improvement acquisition function, and the second Bayesian acquisition function is the model variance acquisition function.

12. The medium of claim 9 wherein running the second Bayesian acquisition function is based on data from the second data set generated by the first Bayesian acquisition function.

13. The medium of claim 9 wherein the instructions further comprise:

using the first and second Bayesian acquisition functions to analyze the first, second, third, fourth, and fifth data sets; and running the first Bayesian acquisition function based on data from the fourth data set generated by the first Bayesian acquisition function.

14. The medium of claim 9 wherein:

the data sets include target output defined by an objective function as well as field data that is auxiliary to the target output; and the first and second Bayesian acquisition functions rely upon the field data for generating input parameters.

15. A system for optimizing input parameters for an industrial process, the system comprising:

a memory; and at least one processor operatively coupled with the memory and executing program code from the memory for:

executing a computation model of an industrial process using seed input parameters to generate a first output, the seed input parameters and first output forming a first data set;

applying a first Bayesian acquisition function to the first data set to generate a second input parameter and then executing the computation model using the second input parameter to generate a second data set;

applying a second Bayesian acquisition function to the first data set to generate a third input parameter and then executing the computation model using the third input parameter to generate a third data set, wherein the first and second Bayesian acquisition functions are different types of Bayesian acquisition functions from one another;

using the first and second Bayesian acquisition functions to analyze the first, second, and third data sets;

running the first Bayesian acquisition function based on data from the third data set generated by the second Bayesian acquisition function to generate a fourth input parameter and then executing the computation model using the fourth input parameter to generate a fourth data set;

running the second Bayesian acquisition function based on data from the second or third data set to generate a fifth input parameter and then executing the computational model using the fifth input parameter to generate a fifth data set;

selecting a best input parameter from among an output from the first and second types of Bayesian acquisition functions, wherein the output comprises the first, second, third, fourth, or fifth input parameter; and setting the best input parameter on a physical component that performs the industrial process.

16. The system of claim 15, wherein the types of Bayesian acquisition functions are selected from the group consisting of:

an expected improvement acquisition function, a probability of improvement acquisition function, a negative lower confidence bounds acquisition function, and a model variance acquisition function.

17. The system of claim 16, wherein the first Bayesian acquisition function is the expected improvement acquisition function, and the second Bayesian acquisition function is the model variance acquisition function.

18. The system of claim 15 wherein running the second Bayesian acquisition function is based on data from the second data set generated by the first Bayesian acquisition function.

19. The system of claim 15 wherein the program code further comprises:

using the first and second Bayesian acquisition functions to analyze the first, second, third, fourth, and fifth data sets; and running the first Bayesian acquisition function based on data from the fourth data set generated by the first Bayesian acquisition function.

20. The system of claim 15 wherein:

the data sets include target output defined by an objective function as well as field data that is auxiliary to the target output; and the first and second Bayesian acquisition functions rely upon the field data for generating input parameters.

* * * * *